United States Patent
Nagamatsu

(10) Patent No.: US 7,321,808 B2
(45) Date of Patent: Jan. 22, 2008

(54) ROBOT AND MULTIPLE ROBOT CONTROL METHOD

(75) Inventor: Kenji Nagamatsu, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 0 days.

(21) Appl. No.: 11/602,979

(22) Filed: Nov. 22, 2006

(65) Prior Publication Data

US 2007/0118249 A1   May 24, 2007

(30) Foreign Application Priority Data

Nov. 24, 2005   (JP)   ............................. 2005-338764

(51) Int. Cl.
*G05B 19/418* (2006.01)

(52) U.S. Cl. ...................... 700/248; 700/245; 700/246; 700/247; 700/249; 700/250; 700/251; 700/252; 700/253; 700/254; 700/255; 318/568.11; 318/568.12; 318/568.13; 318/568.14; 318/568.16; 219/121.61; 219/121.62; 219/121.64; 219/125.11; 219/125.12; 901/2; 901/8; 901/9; 901/16; 901/23

(58) Field of Classification Search ................ 700/245, 700/246, 247, 248, 249, 250, 251, 252, 253, 700/254, 255, 256, 257, 258, 259; 219/121.61, 219/121.62, 121.63, 121.64, 125.11, 125.12; 318/568.11, 568.12, 568.13, 568.14, 568.15, 318/568.16, 568.17; 901/2, 8, 9, 16, 23

See application file for complete search history.

(56) References Cited

U.S. PATENT DOCUMENTS

| 6,212,444 | B1 | 4/2001 | Kato et al. | |
|---|---|---|---|---|
| 6,356,806 | B1 * | 3/2002 | Grob et al. | 700/245 |
| 6,928,337 | B2 * | 8/2005 | Watanabe et al. | 700/245 |
| 7,133,747 | B2 * | 11/2006 | Hashimoto et al. | 700/264 |
| 7,136,723 | B2 * | 11/2006 | Hirayama et al. | 700/245 |
| 7,177,724 | B2 * | 2/2007 | Cantello et al. | 700/264 |
| 7,209,801 | B2 * | 4/2007 | Anfindsen et al. | 700/245 |
| 7,236,854 | B2 * | 6/2007 | Pretlove et al. | 700/246 |

FOREIGN PATENT DOCUMENTS

JP   A 10-003308   1/1998

* cited by examiner

*Primary Examiner*—Thomas Black
*Assistant Examiner*—McDieunel Marc
(74) *Attorney, Agent, or Firm*—Oliff & Berridge, PLC

(57) ABSTRACT

When braking of a motion of a part of a first robot is assumed to be started at points in time, a first stop position of the first robot part is estimated at each point in time. When braking of a motion of a part of a second robot is assumed to be started at the points in time, an estimated second stop position of the second robot part is obtained at each point in time. When it is determined that the first stop position of the first robot part at one of the points in time and either the actual position or the second stop position of the second robot part for each interval at the one of the points in time are contained in the shared workspace, the first robot part is braked.

6 Claims, 5 Drawing Sheets

ROBOT AND MULTIPLE ROBOT CONTROL METHOD

CROSS REFERENCE TO RELATED APPLICATIONS

This application is based on Japanese Patent Application 2005-338764 filed on Nov. 24, 2005. This application claims the benefit of priority from the Japanese Patent Application, so that the descriptions of which are all incorporated herein by reference.

FIELD OF THE INVENTION

The present invention relates to multiple robot control methods capable of avoiding interference between a plurality of robots in a shared workspace thereof, and a robot having a shared workspace with another robot, which is capable of avoiding interference between another robot in the shared workspace.

BACKGROUND OF THE INVENTION

When a plurality of robots are arranged to be close to each other, the plurality of robots may at least partially share a workspace. For example, let us consider a working system in which first and second robots that respectively perform continuous first and second processes are arranged to be close to each other. In this case, the first robot is programmed to transfer a processed workpiece in the first process so as to mount it on a pallet, and the second robot is programmed to grasp the workpiece mounted on the pallet so as to perform the second process using the grasped workpiece.

In the working system set forth above, the first and second robots share at least partially a workspace on the pallet.

Such robots arranged to share a workspace may interfere with each other in the shared workspace.

An example of methods for avoiding the interference is disclosed in U.S. Pat. No. 6,212,444B1 corresponding to Japanese Unexamined Patent Publications No. H10-3308.

In the interference avoiding method disclosed in the US Patent Publication, a common area in which the workspace of a movable part of a robot and that of a movable part of a cooperative apparatus overlap and interfere with each other is set When the movable part of any one of the robot and the cooperative apparatus enters the common area, an entrance-forbidding signal is output to the other of the robot and the cooperative apparatus; this entrance-forbidding signal deactivates the movable part of the other of the robot and the cooperative apparatus.

Let us consider the interference avoiding method disclosed in the US Patent Publication is applied to a working system in which first and second robots are arranged to share a same workspace.

In this application, when an arm (movable part) of any one of the first and second robots, such as the first robot, is traveled to enter the some workspace, an entrance-forbidding signal may be output from the first robot to a controller of the second robot. In response to the entrance-forbidding signal, the controller of the second robot brakes the motion of the arm thereof.

Although the controller of the second robot starts braking the motion of the arm thereof immediately after receiving the entrance-forbidding signal, the inertia of the arm of the second robot prevents it from stopping at the moment of the start of braking, so that it has shifted by an arbitral distance since the moment of the start of braking.

The distance of the arm of the second robot from the start of braking until it is stopped, referred to as "braking distance", hereinafter, depends on the weight of the arm and the traveling speed of the arm of the second robot.

If the controller of the second robot receives the entrance-forbidding signal when the arm thereof is located close to the shared workspace, the arm stop position may be deeply in the shared workspace.

SUMMARY OF THE INVENTION

In view of the background, an object of an aspect of the present invention is to avoid, as soon as possible, entrance of a movable part of one of a plurality of robots into a shared workspace of the plurality of robots when another at least one of the plurality of robots is located in the shared workspace.

According to one aspect of the present invention, there is provided a multiple robot control method for a plurality of robots each with a movable part The plurality of robots share a workspace and operate the movable parts, respectively. The method includes, when braking of a motion of the operated movable part of a first robot in the plurality of robots is assumed to be started at plurality of points in time, estimating a first stop position of the movable part of the first robot at each point in time. The method includes, when braking of a motion of the operated movable part of a second robot in the plurality of robots is assumed to be started at the plurality of points in time, obtaining an estimated second stop position of the movable part of the second robot at each point in time. The method includes determining, at least one of the points in time, whether the estimated first stop position of the movable part of the first robot and at least one of an actual position and the obtained second stop position of the movable part of the second robot are contained in the shared workspace. The method includes braking the movable part of the first robot when it is determined that the estimated first stop position of the movable part of the first robot at the at least one of the points in time and at least one of the actual position and the obtained second stop position of the movable part of the second robot at the at least one of the points in time are contained in the shared workspace.

According to another aspect of the present invention, there is provided a robot communicable with another robot and having a workspace shared with another robot. The robot includes a robot body having a movable part, and an operating unit configured to operate the movable part. The robot includes a first estimating unit is configured to estimate, when braking of a motion of the operated movable part is assumed to be started at a plurality of points in time, a first stop position of the movable part at each point in time. The robot includes an accessing unit configured to access another robot to obtain, when braking of a motion of an operated movable part of another robot is assumed to be started at the plurality of points in time, an estimated second stop position of the movable part of another robot at each point in time. The accessing unit is configured to obtain an actual position of the operated movable part of another robot at each point in time. The robot includes a first determining unit configured to determine, at least one of the points in time, whether the estimated first stop position of the movable part and at least one of the actual position and the obtained second stop position of the movable part of another robot are contained in the shared workspace. The robot includes a braking unit configured to brake the movable part when it is determined that the estimated first stop position of the movable part at the at least one of the points in time and at least one of the actual position and the obtained second stop position of the movable part of another robot at the at least one of the points in time are contained in the shared workspace.

According to a further aspect of the present invention, there is provided a robot controller for a robot communicable with another robot and having a movable part and a workspace shared with another robot, in which the robot controller is operatively connected to a braking unit. The robot controller is programmed to operate the movable part, and estimate, when braking of a motion of the operated movable part is assumed to be started at a plurality of points in time, a first stop position of the movable part of the robot at each point in time. The robot controller is programmed to access another robot to obtain, when braking of a motion of an operated movable part of another robot is assumed to be started at the plurality of points in time, an estimated second stop position of the movable part of another robot based on the accessed result at each point in time. The robot controller is programmed to access another robot to obtain an actual position of the operated movable part of another robot at each point in time. The robot controller is programmed to determine, at at least one of the points in time, whether the estimated first stop position of the movable part of the robot and at least one of the actual position and the obtained second stop position of the movable part of another robot are contained in the shared workspace. The robot controller is programmed to control the braking unit to brake the movable part when it is determined that the estimated first stop position of the movable part of the robot at the at least one of the points in time and at least one of the actual position and the obtained second stop position of the movable part of another robot at the at least one of the points in time are contained in the shared workspace.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the FIGS. 1 to 5.

Figure 1:
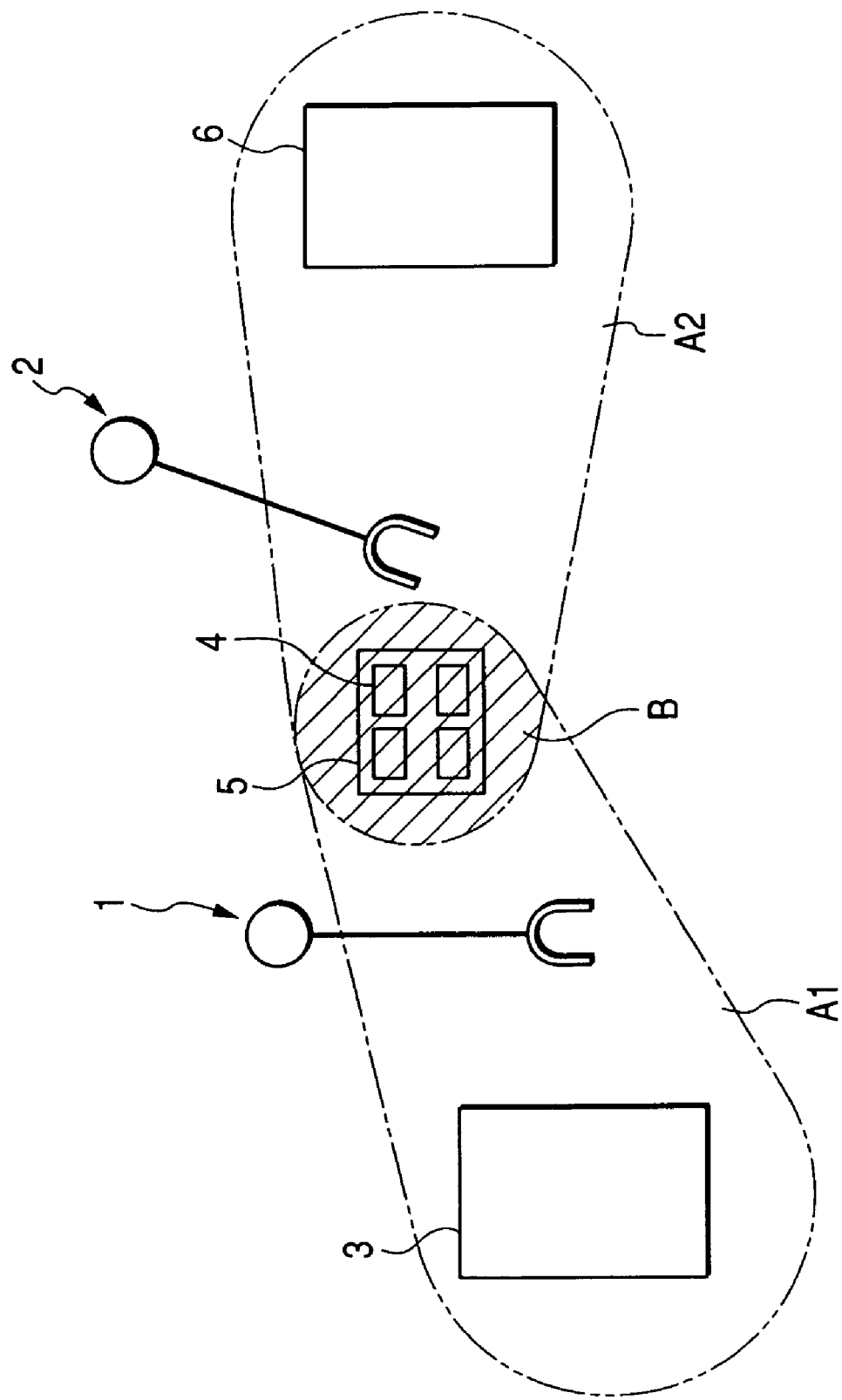
FIG. 1 is a top plan view schematically illustrating an example of the structure of a working system consisting essentially of first and second robots according to an embodiment of the present invention.

In the embodiment, referring to FIG. 1, there are first and second robots 1 and 2 mounted on a common horizontal plane through bases and arranged to be close to each other. In FIG. 1, the first and second robots 1 and 2 are schematically illustrated as vertical articulated robots, and the bases are schematically illustrated as circles.

For example, the first and second robots 1 and 2 constitute a working system in which the first robot 1 performs a predetermined first process and the second robot 2 performs the next second process after the completion of the first process.

Specifically, the first robot 1 is programmed to perform the first process of a workpiece 4 mounted on a workbench 3 mounted on the mount plane, and thereafter, to transfer the processed workpiece 4 toward a pallet 5 mounted on the mount plane to thereby mount it on the pallet 5.

The second robot 2 is programmed to grasp the workpiece 4 mounted on the pallet 5, and to transfer the grasped workpiece 4 toward a workbench 6 mounted on the mount surface to thereby mount it on the workbench 6. The second robot 2 is programmed to execute the second process of the workpiece 4 mounted on the workbench 6.

As illustrated in FIG. 1, when an X-Y plane is defined in the mount plane, and a Z-axis is defined to be orthogonal to the X-Y plane, the first robot 1 has a predetermined three-dimensional first workspace A1 in the X-Y-Z coordinate space. Similarly, the second robot 2 has a predetermined three-dimensional second workspace A2 in the X-Y-Z coordinate space.

The first workspace A1 and the second workspace A2 are overlapped with each other at an area covering the pallet 5. The overlapped space B serves as a shared space B of the first and second robots 1 and 2, which is illustrated by hatching in FIG. 1.

An example of the structure of the first robot 1 will be described hereinafter. It is to be noted that the structure of the second robot 2 is identical to that of the first robot 1. For this reason, similar reference characters are assigned to identical components of the first and second robots 1 and 2, and therefore, descriptions of the structure of the second robot 2 will be omitted or simplified.

Figure 2:
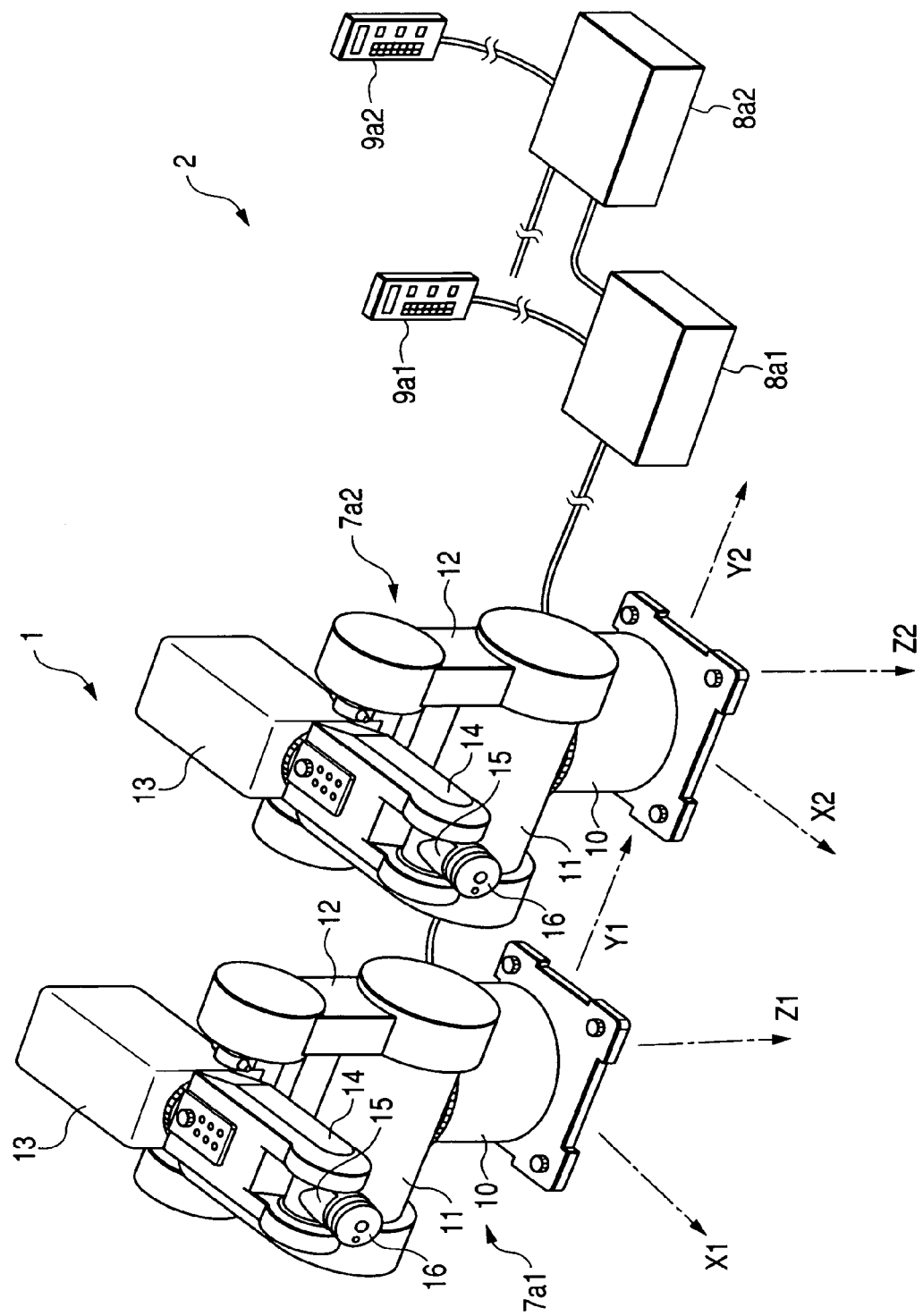
FIG. 2 is a perspective view schematically illustrating an example of the hardware configuration of each of the first and second robots according to the embodiment of the present invention.

Referring to FIG. 2, the first robot 1 according to the embodiment includes a robot body 7a1, a controller 8a1 for controlling the robot body 7a1, and a teaching pendant 9a1 as a teaching box for the controller 8a1. The robot body 7a1 is electrically connected to the controller 8a1, and the controller 8a1 is electrically connected to the teaching pendant 9a1 through a cable.

The robot body 7a1 as a control target for the controller 8a1 is designed as, for example, a vertical articulated robot.

Specifically, the robot body 7a1 is composed of a substantially cylindrical-shaped base 10 mounted on the horizontal mount plane, and a substantially cylindrical-shape shoulder joint 11 mounted on the base 10 such that the center axial direction of the shoulder joint 11 is orthogonal to the center axial direction of the base 10. The shoulder joint 11 is configured to be horizontally rotatable on the base 10 about a center axis thereof.

The robot body 7a1 is also composed of a pair of upper arms (upper arm joints) 12. One ends of the pair of upper arms 12 are pivotally supported by both ends of the shoulder joint 11 about the center axis thereof in the vertical direction corresponding to the center axial direction of the base 10.

The robot body 7a1 is composed of a first lower arm 13 pivotally supported by the other ends of the upper arms 12 in the vertical direction corresponding to the center axial direction of the base 10.

The robot body 7a1 is composed of a second lower arm 14 extending from the first lower arm 13 and rotatably supported thereby about the extending direction. The tip end of the second lower arm 14 is forked. The first and second lower arms 13 and 14 constitute a lower arm joint.

The robot body 7a1 is composed of a substantially cylindrical-shaped wrist joint 15 inserted between the forked ends of the second lower arm 14 and pivotally supported thereby in the vertical direction corresponding to the center axial direction of the base 10.

The wrist joint 15 is formed with a flange 16 projecting therefrom. The flange 16 has a tip end to be rotatable about the projecting direction such that the tip end permits the mounting of a mechanical hand (mechanical gripper) 17a1 (see FIG. 4) formed with a grip portion that can grip various types of members including the workpiece 4. Specifically, the flange 16 (its tip end thereof serves as a hand joint.

The first robot 1 also includes a number of motors 24 as actuators. For example, in the embodiment, DC (Direct Current) servo motors can be preferably used as the motors 24.

Specifically, the base 10 is integrated with at least one of the motors 24 and a rotation transmission system (not shown) that transfers rotation of at least one of the motors 24 to the shoulder joint 11 to horizontally rotate it.

The shoulder joint 11 is integrated with at least one of the motors 24 and a rotation transmission system (not shown) that transfers rotation of at least one of the motors 24 to the upper arms 12 to vertically pivot them together with each other.

The upper arm joints 12 are integrated with at least one of the motors 24 and a rotation transmission system (not shown) that transfers rotation of at least one of the motors 24 to the first lower arm 13 to vertically pivot it.

The first lower arm 13 is integrated with at least one of the motors 24 and a rotation transmission system (not shown) that transfers rotation of at least one of the motors 24 to the second lower arm 14 to rotate it about the extending direction.

The second lower arm 14 is integrated with at least one of the motors 24 and a rotation transmission system (not shown) that transfers rotation of at least one of the motors 24 to the wrist joint 15 to vertically pivot it.

The flange 16 is integrated with at least one of the motors 24 and a rotation transmission system (not shown) that transfers rotation of at least one of the motors 24 to the mechanical hand 17a1 to rotate it about the projecting direction of the flange 16.

Specifically, the base 10, the shoulder joint 11, the upper arm joints 12, the lower arm joint (the first and second lower arms 13 and 14), the wrist joint 15, and the hand joint (flange) 16 of the robot body 7 serve as linkages (linkage mechanisms) of the first robot 1.

Information indicative of dimensions of each of the linkages 11 to 16 and the hand 17a1, such as the length of each of the linkages 11 to 16 in the longitudinal direction or axial direction, are stored beforehand in, for example, a ROM of the controller 8a1 described hereinafter.

Figure 3:
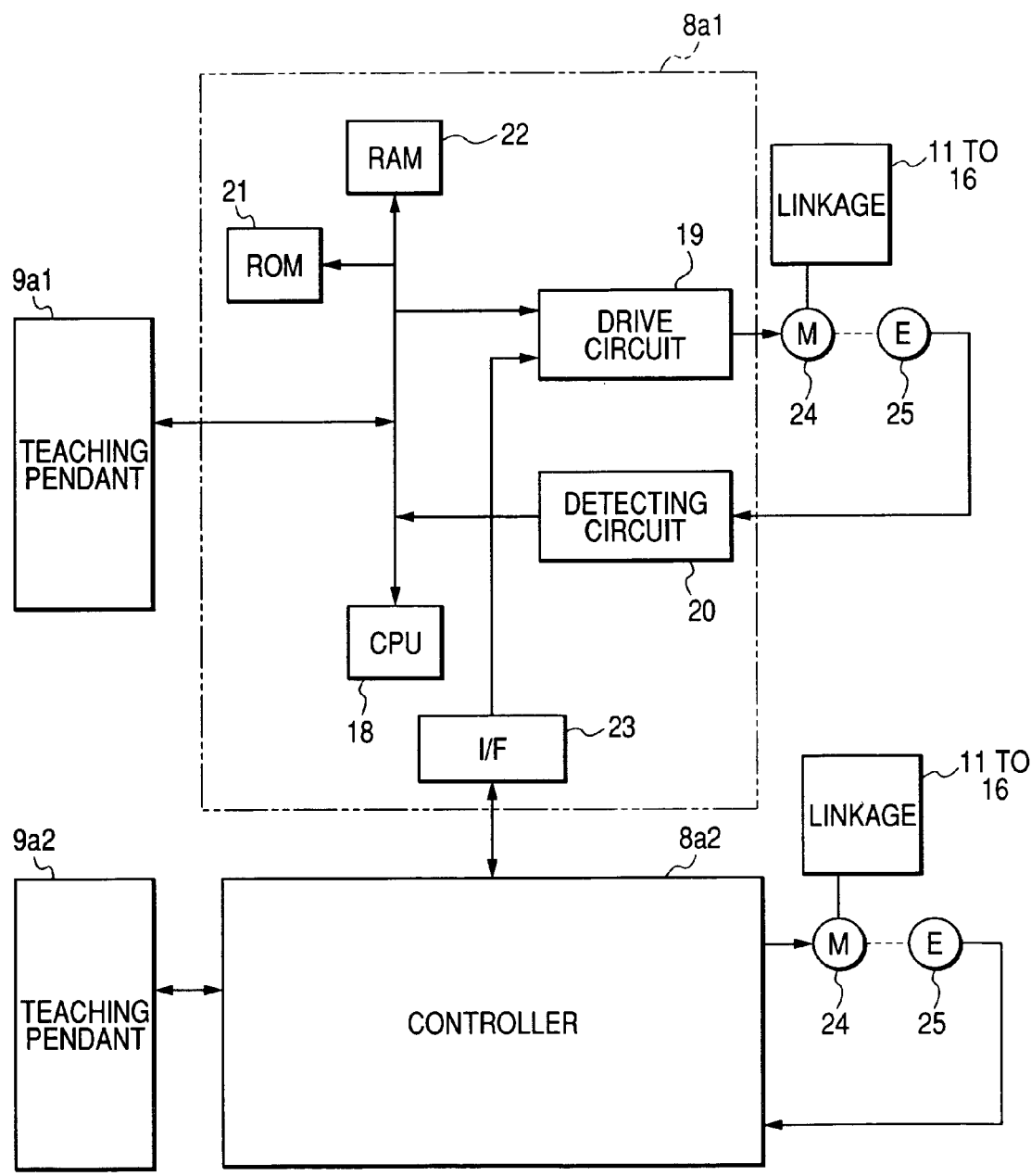
FIG. 3 is a block diagram schematically illustrating an example of the system configuration of each of the first and second robots illustrated in FIG. 2.

As illustrated in FIG. 3, the controller 8a1 includes a CPU 18 serving as a control unit, drive circuits 19 for driving the motors 24a1, a detecting circuit 20, a ROM (Read Only Memory, such as an EEPROM, flash ROM, or the like) 21, a RAM (Random Access Memory) 22, and an interface (I/F) 23. The elements 19 to 23 are electrically connected to the CPU 18.

The ROM 21 has stored therein system programs that cause the CPU 18 to control the system resources of the first robot 1. The ROM 21 also has stored therein a robot language for creating a robot motion program.

The RAM 22 has stored therein the robot motion program and the like.

The I/F 23 is designed to be electrically connectable to the teaching pendant 9a1.

It is to be noted that, in FIG. 3, the shoulder joint 11, the upper arm joints 12, the lower arm joint (the first and second lower arms 13 and 14), the wrist joint 15, and the hand joint 16 are collectively illustrated as a linkage by one block. Reference numerals 11, 12, 13, 14, 15, and 16 are assigned to the block of linkage.

As the motors for driving the linkages (joint portions) 11 to 16 are collectively illustrated as one block to which reference numeral 24 is assigned.

The detecting circuit 20 is operative to detect an actual position and an actual angular velocity of each of the linkages 11, 12, 13, 14, 15, and 16.

It is to be noted that, for example, each of the linkages 11 to 16 and the hand 17a1 has a predetermined reference position. Thus, the actual position of each of the linkages 11 to 16 and the hand 17a1 can be detected as the actual position of the reference position of each of the linkages 11 to 16 and the hand 17a1.

Specifically, a rotary encoder 25 is attached to, for example, the rotating shaft of each of the motors 24, and is electrically connected to the detecting circuit 20.

The rotary encoder 25 serves as a position sensor and a speed sensor. Specifically, the rotary encoder 25 is configured to output digital pulses that correspond to angular motion (revolution) of the rotating shaft of each of the motors 24. The pulse signal consisting of the train of the digital pulses is given to the detecting circuit 20.

The detecting circuit 20 is operative to detect, based on the pulse signal sent from each of the rotary encoders 25, the actual position of the rotating shaft of each of the motors 24, and therefore, the actual position of each of the linkages 11 to 16.

In addition, the detecting circuit 20 is operative to:

count the number of the pulses in the pulse signal input from each of the rotary encoders 24 per unit of time; and detect, based on the counted result, the actual angular velocity of the rotating shaft of each of the motors 24, in other words, the actual angular velocity of each of the linkages 11 to 16.

The detecting circuit 20 is also operative to give the CPU 18 information indicative of the actual position and actual angular velocity of each of the linkages 11 to 16.

The CPU 18 is operative to execute feedback control of the motion of each of the linkages (the joint portions) 11 to 16 in accordance with the robot motion program using the information sent from the detecting circuit 20.

Each of the drive circuits 19 is operative to supply, to each of the corresponding motors 24, a drive current under control of the CPU 18 to rotatably drive the individual motors 24 corresponding to the individual linkages 11 to 16, thereby controlling the pose of each of the linkages 11 to 16.

The drive circuits 19 and the corresponding motors 24 also serve as regenerative braking means or reverse-torque braking means for braking corresponding linkages 11 to 16.

Specifically, a drive circuit 19 is operative to switch the direction of current to be supplied to a corresponding motor 24 to allow the motor 24 to become a generator to thereby generate reverse torque to be applied in the direction opposite to the motor rotating direction. The reverse torque allows a corresponding one of the linkages 11 to 16 to be braked. Preferably, power generated by the motor 24 serving as the generator can be delivered to a power supply unit (not shown) of the controller 8a1 to be charged therein.

In the embodiment, it is to be noted that the weight of each of the linkages 11 to 16 has been measured to be stored in, for example, the ROM 21, and, as described above, the actual angular velocity of each of the linkages 11 to 16 is detected to be sent to the CPU 18.

For this reason, when controlling the drive circuits 19 and the motors 24 to start braking the motion of each of the linkages 11 to 16, the CPU 18 is operative to compute a distance by which each of the linkages 11 to 16 and the hand 17a1 has passed since the start of braking. The distance will be referred to as braking distance hereinafter.

Figure 4:
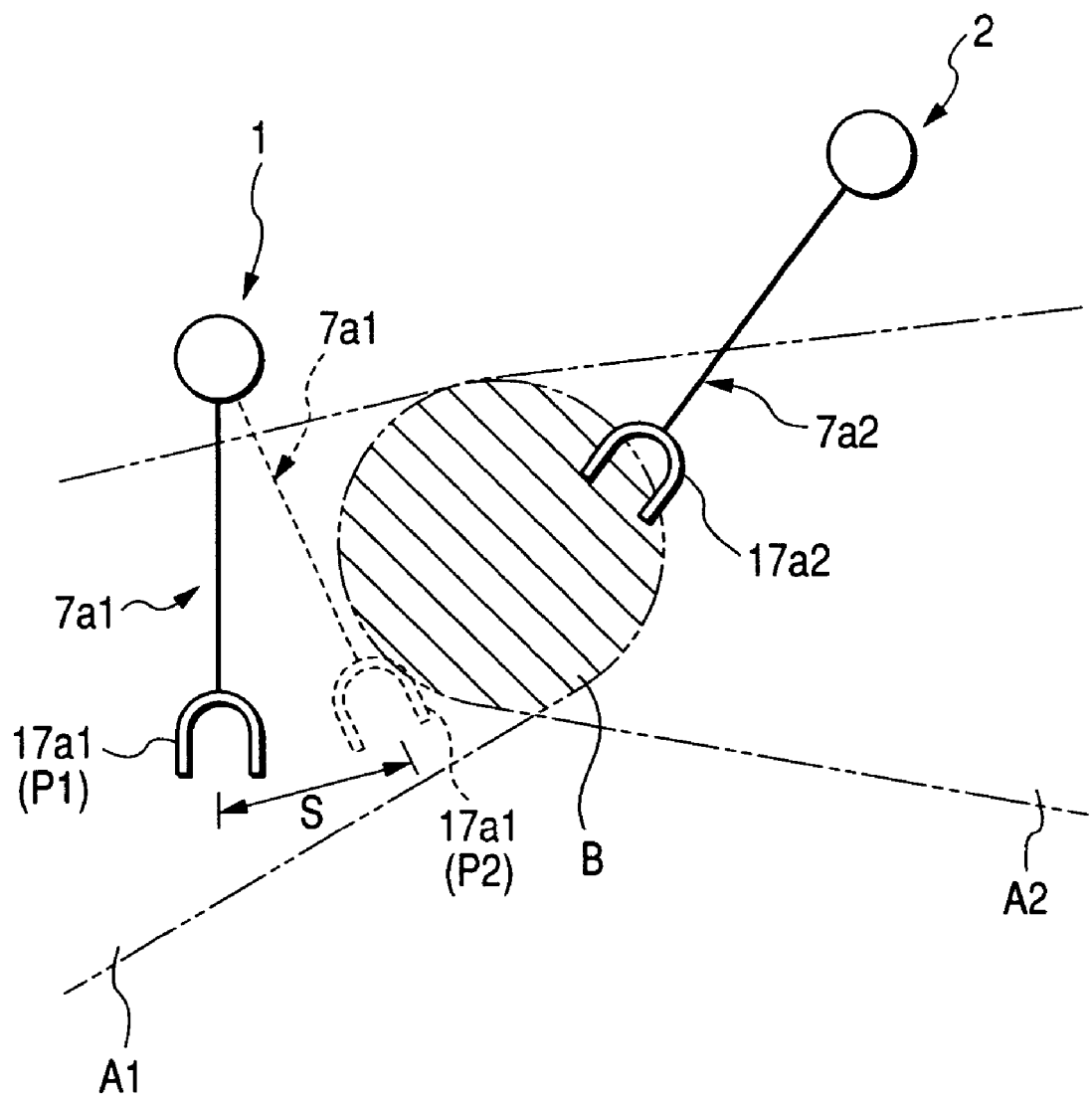
FIG. 4 is an enlarged view schematically illustrating a positional relationship between a shared workspace and each of the first and second robots according to the embodiment.

For example, in FIG. 4, an example of the braking distance of the hand 17a1 of the first robot 1 between a position P1 and a position P2 is illustrated by a reference character "S". Specifically, FIG. 4 represents that the hand 17a1 has shifted from the position P1 to the position P2 by the braking distance S since the start of braking.

Note that, in the embodiment, as illustrated in FIG. 2, a robot coordinate system (X1, Y1, Z1) of the base 10 is established independently of the motion of each of the linkages 11 to 16 of the robot body 7a1 of the first robot 1.

For example, the robot coordinate system (X1, Y1, Z1) is, for example, established such that:

the Y1 axis is parallel to the center axis of the shoulder joint 11;

the Z1 axis thereof coincides with the center axis of the base 10; and the X1 axis is orthogonal to the Y and Z axes.

The robot coordinate system (X1, Y1, Z1) of the first robot 1 is used as the reference coordinate system of the first robot 1.

In addition, in the embodiment, a fixed three-dimensional coordinate system (linkage coordinate system) is established for each of the linkages 11 to 16. The position and orientation of the linkage coordinate system of each of the linkages 11 to 16 in the reference coordinate system (X, Y1, Z1) depends on the motion of each of the linkages 11 to 16.

Specifically, the CPU 18 is operative to convert the pose (position and orientation) of each of the linkages 11 to 16 on the corresponding linkage coordinate system into a position and an orientation in the reference coordinate system (X1, Y1, Z1) based on the information indicative of the actual position of each of the linkages 11 to 16 detected by the detecting circuit 20 and that indicative of the dimensions of each of the linkages 11 to 16 stored in the ROM 21.

Similarly, the second robot 2 includes a robot body 7a2, a controller 8a2 for controlling the robot body 7a2, and a teaching pendant 9a2 as a teaching box for the controller 8a2. The robot body 7a2 is electrically connected to the controller 8a2, and the controller 8a2 is electrically connected to the teaching pendant 9a2 through a cable.

As illustrated in FIG. 2, the robot body 7a2 has the same structure as the robot body 7a1. Like the robot body 7a1, a robot coordinate system (X2, Y2, Z2) of the base 10 of the second robot 2 is established independently of the motion of each of the linkages 11 to 16 of the robot body 7a2 of the second robot 2, which is used as a reference coordinate system of the second robot 2.

In addition, the controller 8a2 of the second robot 2 has the same structure as the controller 8a1 of the first robot 1. The controllers 8a1 and 8a2 are communicable with each other via their interfaces 23.

Coordinates in the reference coordinate system (X1, Y1, Z1) of the first robot 1 and those in the reference coordinate system (X2, Y2, Z2) of the second robot 2 can be easily converted with each other.

Accordingly, the controller 8a1 of the first robot 1 is operative to:

freely access the controller 8a2 to read the pose (position and orientation) of each of the linkages 11 to 16 of the second robot 2 in the reference coordinate system (X2, Y2, Z2); and convert the pose (position and orientation) of each of the linkages 11 to 16 of the second robot 2 in the reference coordinate system (X2, Y2, Z2) into a pose (position and orientation) of each of the linkages 11 to 16 of the second robot 2 in the reference coordinate system (X1, Y1, Z1).

Similarly, the controller 8a2 of the second robot 2 is operative to:

freely access the controller 8a1 to read the pose (position and orientation) of each of the linkages 11 to 16 of the first robot 1 in the reference coordinate system (X1, Y1, Z1); and convert the pose (position and orientation) of each of the linkages 11 to 16 of the first robot 1 in the reference coordinate system (X1, Y1, Z1) into a pose (position and orientation) of each of the linkages 11 to 16 of the first robot 1 in the reference coordinate system (X2, Y2, Z2).

On the other hand, the teaching pendant 9a1 is designed to a handheld device composed of an input unit, a display unit, a memory unit, and a computing unit, which allow execution of basic functions, such as program start function, motion teaching function, machine lock functions, error message displaying functions, and the like. This handheld configuration of the teaching pendant 9a1 allows an operator to control the robot body 7a1 while observing the motion of the robot body 7a1.

In the embodiment, information indicative of intended motions of the hand 17a1 of the robot body 7a1 is given to the controller 8a1 by teaching tasks of the teaching pendant 9a1.

Specifically, the teaching pendant 9a1 is operative to:

execute a teaching task of actually moving the hand 17a1 of the robot body 7a1 at desired target positions based on intended motions while bringing the hand 17a1 to a desired pose at each of the desired target positions;

teach the controller 8a1 target command positions of each of the linkages 11 to 16 of the robot body 7a1 in the reference coordinate system, which correspond to the desired target positions and are required to move the hand 17a1 through the trajectory based on the desired target positions; and teach the controller 8a1 a target pose of each of the linkages 11 to 16 at each of the target command positions in the reference coordinate system, which is required to bring the hand 17a1 to the desired pose at each of the desired target positions.

The controller 8a stores the taught target command positions and the target poses respectively corresponding thereto of each of the linkages 11 to 16 of the robot body 7a1 in the RAM 22.

As well as the teaching pendant 7a1, the teaching pendant 7a2 of the second robot 2 is operative to:

execute a teaching task of actually moving the hand 17a2 of the robot body 7a2 at desired target positions based on intended motions while bringing the hand 17a2 to a desired pose at each of the desired target positions;

teach the controller 8a2 target command positions of each of the linkages 11 to 16 of the robot body 7a2, which correspond to the desired target positions and are required to move the hand 17a2 through the trajectory based on the desired target positions; and teach the controller 8a2 a target pose of each of the linkages 11 to 16 at each of the target command positions, which is reed to bring the hand 17a2 to the desired pose at each of the desired target positions.

The controller 8a2 stores the taught command positions and the target poses respectively corresponding thereto of each of the linkages 11 to 16 of the robot body 7a2 in the RAM 22.

In the embodiment, the intended motions of the hand 17a1 of the first robot 1 to be taught to the controller 8a1 are required for the first robot 1 to:

perform the first process of a workpiece 4 mounted on the workbench 3;

transfer the processed workpiece 4 toward the pallet 5; and mount it on the pallet 5.

Similarly, the intended motions of the hand 17a2 of the second robot 2 to be taught to the controller 8a2 are required for the second robot 2 to:

grasp a workpiece 4 mounted on the pallet 5;

transfer the grasped workpiece 4 toward the workbench to mount it thereon; and perform the second process of the workpiece 4 mounted on the workbench 6.

During teaching of the target command positions of each linkage to the controller 8a1, the predetermined three-dimensional first workspace A1 of the first robot 1 and the shared workspace B of the first and second robots 1 and 2 are stored in the ROM 21 of the controller 8a1 as a coordinate space in the reference coordinate system (X1, Y1, Z1).

Similarly, during teaching of the target command positions of each linkage to the controller 8a2, the predetermined three-dimensional second workspace A2 of the second robot 2 and the shared space B of the first and second robots 1 and 2 are stored in the ROM 21 of the controller 8a2 as a coordinate space in the reference coordinate system (X2, Y2, Z2).

In order to operate the robot body 7a1 in accordance with the intended motions taught by the teaching pendant 9a1, the CPU 18 of the controller 8a1 sends, at predetermined intervals, an operation command for each of the linkages 11 to 16 to corresponding each of the motors 24 through a corresponding one of the drive circuits 19. The spaced operation commands respectively represent the target command positions and the target poses of each of the linkages 11 to 16 stored in the RAM 22.

Each of the motors 24 moves a corresponding one of the linkages 11 to 16 of the robot body 7a1 up to a target command position corresponding to each of the sent operation commands while bringing the corresponding one of the linkages 11 to 16 to a target pose associated with the target command position.

As a result, in accordance with the taught motions, the hand 17a1 of the first robot 1 works to perform the first process of a workpiece 4 mounted on the workbench 3, transfer the processed workpiece 4 toward the pallet 5, mount it on the pallet 5, and return to the workbench 3.

Similarly, in order to operate the robot body 7a2 in accordance with the intended motions taught by the teaching pendant 9a2, the CPU 18 of the controller 8a2 sequentially sends, at predetermined intervals, an operation command for each of the linkages 11 to 16 to corresponding each of the motors 24 through a corresponding one of the drive circuits 19. The spaced operation commands respectively represent the target command positions and the target poses of each of the linkages 11 to 16 stored in the RAM 22.

Each of the motors 24 moves a corresponding one of the linkages 11 to 16 of the robot body 7a2 up to a target command position corresponding to each of the sent operation commands while bringing the corresponding one of the linkages 11 to 16 to a target pose associated with the target command position.

As a result, in accordance with the taught motions, the hand 17a2 of the second robot 2 works to:

grasp the workpiece 4 mounted on the pallet 5;

transfer the grasped workpiece 4 toward the workbench 6 to mount it thereon;

perform the second process of the workpiece 4 mounted on the workbench 6; and return to the pallet 5 so as to grasp another one workpiece 4 on the pallet 5.

During repeated execution of the works of the first and second robots 1 and 2, the hands 17a1 and 17a2 of the first and second robots 1 and 2 may simultaneously try to enter into the shared workspace B. Thereafter, the hand 17a1 of the first robot 1 mounts the grasped workpiece 4 on the pallet 5, and simultaneously, the hand 17a2 of the second robot 1 takes the workpiece 4 out of the pallet 5.

An interference avoiding function installed in each of the first and second robots 1 and 2 according to the embodiment however prevents both hands 17a1 and 17a2 of the first and second robots 1 and 2 from actually entering into the shared workspace B at the same instant.

In the embodiment, the CPU 18 of each of the first and second robots 1 and 2 is operative to run the robot motion program stored in the RAM 22 to cause each of the robot bodies 7a1 and 7a2 to perform the corresponding work mentioned above.

Especially, the robot motion program allows the CPU 18 of each robot to implement the interference avoiding function.

Figure 5:
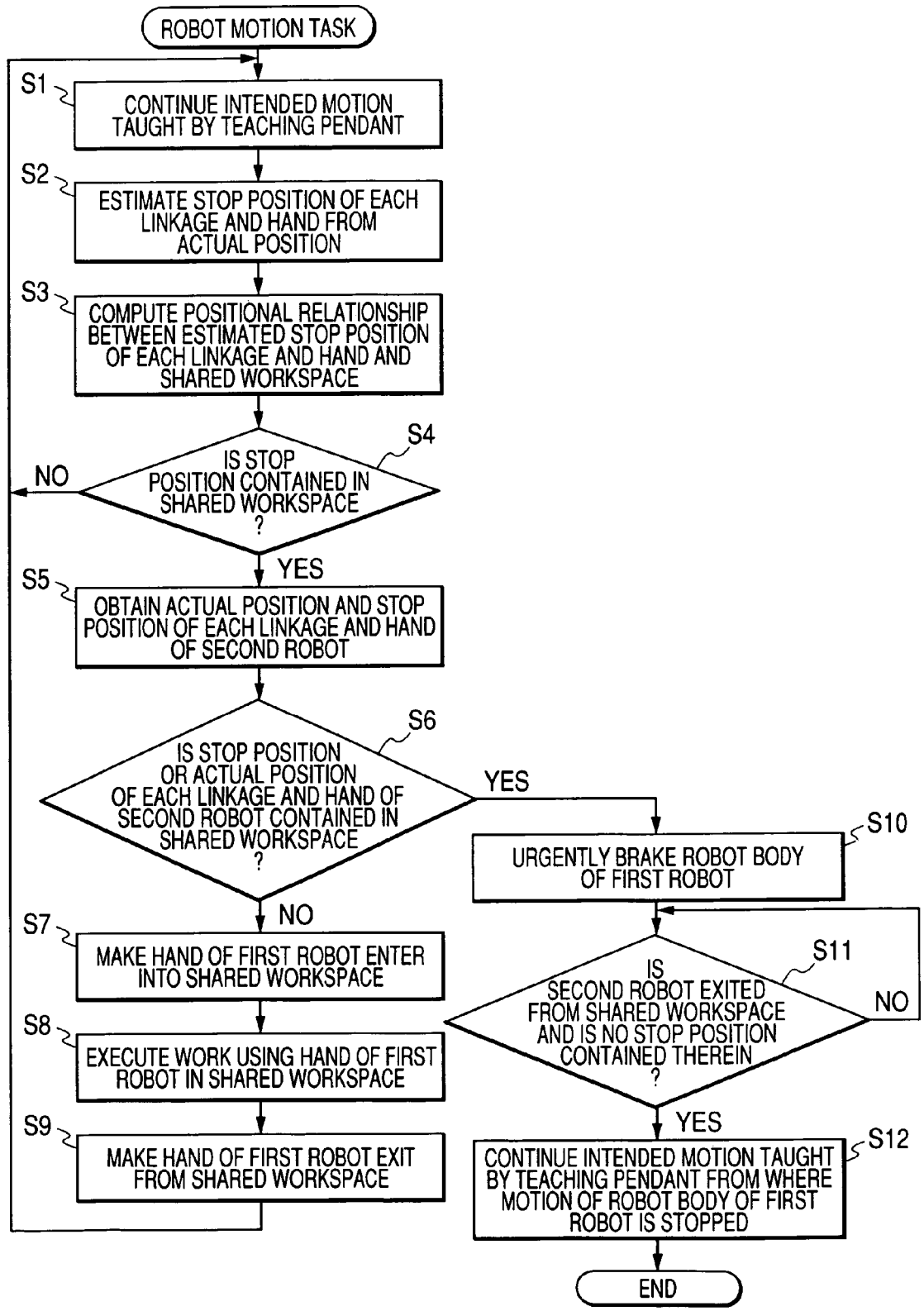
FIG. 5 is a flowchart schematically illustrating a robot motion task to be executed by a controller of each of the first and second robots according to the embodiment.

Next, a robot motion task including an interference avoiding task to be executed by the CPU 18 of each robot in accordance with the robot motion program will be described hereinafter with reference to FIGS. 4 and 5.

In order to facilitate understanding of robot motion task, the robot motion task to be executed by the CPU 18 of the first robot 1 will be described hereinafter.

In the first robot 1, in step S1, the CPU 18 cyclically sends an operation command for each of the linkages 11 to 16 to corresponding each of the motors 24 through a corresponding one of the drive circuits 19. The spaced operation commands respectively represent the target command positions and the target poses of each of the linkages 11 to 16 stored in the RAM 22 of the controller 8a1.

Specifically, every operating-command sending cycle the CPU 18 controls each of the motors 24 so that a corresponding one of the linkages 11 to 16 is moved from a current position (a previous target command position corresponding to a previous operation command) up to a present target command position corresponding to a present operation command while bringing the corresponding one of the linkages 11 to 16 to a present target pose associated with the present target command position in step S1.

The control operation of the CPU 18 allows the robot body 7a1 of the first robot 1 to continue the intended motions taught by the teaching pendant 9a1 in step S1.

In step S2, every operating-command sending cycle the CPU 18 computes an actual position of the hand 17a1.

In step S2, assuming that the CPU 18 controls the drive circuits 19 and the motors 24 to start braking the motion of each of the linkages 11 to 16 by a predetermined first braking torque every operating-command sending cycle, the CPU 18 computes, based on the weight of each linkage and the hand 17a1 and an actual angular velocity of each linkage, a braking distance by which each linkage and the hand 17a1 has passed since the start of braking every operating-command sending cycle.

Moreover, in step S2, every operating-command sending cycle the CPU 18 estimates a stop position (coordinates) of each of the linkages 11 to 16 and the hand 17a1 in the reference coordinate system (X1, Y1, Z1) of the first robot 1 based on the actual position and the braking distance of each of the linkages 11 to 16 and the hand 17a1.

Next, every operating-command sending cycle the CPU 18 computes a positional relationship between the estimated stop position of each of the linkages 11 to 16 and the hand 17a1 and the shared workspace (coordinate space) B in the reference coordinate system (X1, Y1, Z1) of the first robot 1 in step S3.

In step S4, every operating-command sending cycle the CPU 18 determines whether the estimated stop position of at least one of the linkages 11 to 16 and the hand 17a1 is contained in the shared workspace B based on the positional relationship between the estimated stop position of each of the linkages 11 to 16 and the hand 17a1 and the shared workspace B.

If it is determined that no estimated stop positions of the linkages 11 to 16 and the hand 17a1 are contained in the shared workspace B (the determination in step S4 is NO), the CPU 18 returns to step S1. Then, the CPU 18 repeatedly executes the operations in steps S1 to S4 until the determination in step S4 is NO. Continuous motion of the robot body 7a1 of the first robot 1 in step S1 allows the robot body 7a1 of the first robot 1 to:

perform a workpiece 4 mounted on the workbench 3;

grip the processed workpiece 4 by the hand 17a1; and transfer the processed workpiece 4 gripped by the hand 17a1 toward the pallet 5.

As a result, when the robot body 7a1 of the first robot 1 moves close to the shared workspace B (pallet 5), as illustrated in FIG. 4, it is assumed that the estimated stop position of at least one of the obtained stop positions of the linkages 11 to 16 and the hand 17a1 is located inside the shared workspace B at least one point in time corresponding to one operating-command sending cycle.

It is to be noted that the braking distance of the hand 17a1 in this assumption is illustrated by the reference character "S" in FIG. 4.

In this assumption, the determination in step S4 is YES, and therefore, the CPU 18 proceeds to step S5.

It is to be noted that, as described above, simultaneously with the CPU 18 of the first robot 1, the CPU 18 of the second robot 2 executes the operations in steps S1 to S4 to thereby:

estimate a stop position (coordinates) of each of the linkages 11 to 16 and the hand 17a2 in the reference coordinate system (X2, Y2, Z2) of the second robot 2 based on the actual position and the braking distance of each of the linkages 11 to 16 and the hand 17a2 (see step S2);

compute a positional relationship between the estimated stop position of each of the linkages 11 to 16 and the hand 17a2 and the shared workspace (coordinate space) B in the reference coordinate system (X2, Y2, Z2) of the second robot 2 (see step S3); and determine whether the estimated stop position of at least one of the linkages 11 to 16 and the hand 17a2 is contained in the shared workspace B based on the positional relationship between the estimated stop position of each of the linkages 11 to 16 and the hand 17a2 and the shared workspace B (see step S4).

Accordingly, in step S5, the CPU 18 of the first robot 1 accesses the CPU 18 of the second robot 2 through their interfaces 23 to obtain, from the CPU 18 of the second robot 2, the actual position and the stop position of each of the linkages 11 to 16 and the hand 17a2 of the second robot 2 at the at least one point in time in step S4.

Specifically, the CPU 18 of the first robot 1 converts the coordinates of the actual position and the stop position of each of the linkages 11 to 16 and the hand 17a2 of the robot 2 in the reference coordinate system (X2, Y2, Z2) of the second robot 2 into those of the actual position and the stop position of each of the linkages 11 to 16 and the hand 17a2 of the robot 2 in the reference coordinate system (X1, Y1, Z1) of the first robot 1.

Subsequently, the CPU 18 of the robot 1 determines whether the obtained actual position of at least one of the linkages 11 to 16 and the hand 17a2 of the robot 2 at the same point in time is contained in the shared workspace B based on the positional relationship between the obtained actual position of each of the linkages 11 to 16 and the hand 17a2 and the shared workspace B in step S6.

Simultaneously, the CPU 18 of the robot 1 determines whether the obtained estimated stop position of at least one of the linkages 11 to 16 and the hand 17a2 of the robot 2 at the same point in time is contained in the shared workspace B based on the positional relationship between the obtained estimated stop position of each of the linkages 11 to 16 and the hand 17a2 and the shared workspace B in step S6.

If it is determined, at the same point in time, that no estimated stop positions of the linkages 11 to 16 and the hand 17a2 of the second robot 2 and no actual positions thereof are contained in the shared workspace B (the determination in step S6 is NO), the CPU 18 repeatedly executes the operation in step S1.

As a result, the continuous motion of the robot body 7a1 of the first robot 1 in step 31 allows the hand 17a1 of the robot body 7a1 to:

enter into the shared workspace B in step S7;

mount the workpiece 4 on the pallet 5 in the shared workspace B in step S8;

exit from the shared workspace B in step S9; and return to the workbench 3.

Thereafter, the CPU 18 returns to step S1, repeatedly executing the operations in step S1 and later.

Otherwise, if it is determined, at the same point in time, that either the estimated stop position of at least one of the linkages 11 to 16 and the hand 17a2 of the second robot 2 or the actual position of at least one of the linkages 11 to 16 and the hand 17a2 thereof is contained in the shared workspace B (the determination in step S6 is YES), the CPU 18 proceeds to step S10.

In step S10, the CPU 18 urgently brakes the motion of each of the linkages 11 to 16 of the first robot 1.

Specifically, in step S10, the CPU 18 controls a corresponding one of the drive circuits 19 to switch the direction of current to be supplied to each of the motors 24 to allow each of the motors 24 to generate reverse torque to be applied in the direction opposite to the motor rotating direction, thereby braking the motion of each of the linkages 11 to 16 of the first robot 1.

In the embodiment, a second braking torque corresponding to the reverse torque is larger than the first braking torque used in step S2.

As illustrated in FIG. 4, a braking distance of the hand 17a1 obtained in step S10 is shorter than the braking distance S of the hand 17a1 obtained in step S2 based on the first braking torque.

The urgent braking in step S10 allows the robot body 7a1 of the first robot 1 to stop before entrance into the shared workspace B.

After the completion of urgent braking in step S10, the CPU 18 of the first robot 1 stands by for detecting exit of the robot body 7a2 of the second robot 2 from the shared workspace B while accessing the CPU 18 of the second robot 2 to obtain the actual position of each of the linkages 11 to 16 and the hand 17a2 of the robot body 7a2 in step S11.

If it is determined that the robot body 7a2 of the second robot 2 exits from the shared workspace B based on the actual position of each of the linkages 11 to 16 and the hand 17a2 of the robot body 7a2, and that no estimated stop position of at least one of the linkages 11 to 16 and the hand 17a2 of the second robot 2 is contained in the shared workspace B (the determination in step S11 is YES), the CPU 18 proceeds to step S12.

In step S12, the CPU 18 continues the intended motions taught by the teaching pendant 9a1 in step S1 from where the motion of the robot body 7a1 of the first robot 1 has been stopped.

As a result, the continuous motion of the robot body 7a1 of the first robot 1 in step S1 allows the hand 17a1 of the robot body 7a1 to:

enter into the shared workspace B in step S7;

mount the workpiece 4 on the pallet 5 in the shared workspace B in step S8;

exit from the shared workspace B in step S9; and return to the workbench 3.

Thereafter, the CPU 18 returns to step S1, repeatedly executing the operations in step S1 and later.

As described above, the first robot 1 according to the embodiment is programmed to urgently brake the motion of each of the linkages 11 to 16 of the first robot when it is determined that the estimated stop position of at least one of the linkages 11 to 16 and the hand 17a2 of the second robot 2 or the actual position of at least one of the linkages 11 to 16 and the hand 17a2 thereof is contained in the shared workspace B.

This can prevent both the first and second robots 1 and 2 from entering into the shared workspace 3, making it possible to avoid a collision between the first and second robots 1 and 2 in the shared workspace B.

The present invention is not limited to the embodiment described above and illustrated in FIGS. 1 to 5.

Specifically, the urgent braking in step S10 can be executed using braking torque equivalent to the first braking torque used when a stop position of the robot body 7a1 is estimated in step S2. In this modification, even though the robot body 7a1 may enter into the shared workspace B before stopping, it is possible to limit the amount of entrance of the robot body 7a1 into the shared workspace B as little as possible to thereby avoid a collision between the first and second robots 1 and 2 in the shared workspace B.

In step S5, the CPU 18 of the first robot 1 accesses the CPU 18 of the second robot 2 to obtain, from the CPU 18 of the second robot 2, the actual position and the stop position of each of the linkages 11 to 16 and the hand 17a2. The present invention is however not limited to the structure.

Specifically, in place of obtaining the stop position of each of the linkages 11 to 16 and the hand 17a2 of the second robot 2 from the CPU 18 of the second robot 2, the CPU 18 of the first robot 1 can:

read the weight of each linkage and the hand 17a1 and an actual angular velocity of each linkage;

compute, based on the read weight of each linkage and the hand 17a2 and the actual angular velocity of each linkage, a braking distance by which each linkage and the hand 17a2 has passed since the start of braking; and estimate a stop position of each of the linkages 11 to 16 and the hand 17a2 in the reference coordinate system (X1, Y1, Z1) of the first robot 1 based on the actual position and the braking distance of each of the linkages 11 to 16 and the hand 17a2.

The working system according to the embodiment includes the first and second robots 1 and 2, but, in the present invention, the working system can include three or more robots, and the controller of each of the three or more robots can execute the robot motion task.

In step S1, the CPU 18 can cyclically send an operation command for each of the linkages 11 to 16 to corresponding each of the motors 24 through a corresponding one of the drive circuits 19 at regular intervals or irregular intervals.

The present invention can be applied to various types of robots without limiting such a vertical articulated robot.

In the embodiment, the first and second robots individually have first and second controllers, but they can have a shared controller including the same functions as each of the first and second controllers.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A multiple robot control method for a plurality of robots each with a movable part, in which the plurality of robots share a workspace and operate the movable parts, respectively, the method comprising:

when braking of a motion of the operated movable part of a first robot in the plurality of robots is assumed to be started at plurality of points in time, estimating a first stop position of the movable part of the first robot at each point in time;

when braking of a motion of the operated movable part of a second robot in the plurality of robots is assumed to be started at the plurality of points in time, obtaining an estimated second stop position of the movable part of the second robot at each point in time;

determining, at at least one of the points in time, whether the estimated first stop position of the movable part of the first robot and at least one of an actual position and the obtained second stop position of the movable part of the second robot are contained in the shared workspace; and braking the movable part of the first robot when it is determined that the estimated first stop position of the movable part of the first robot at the at least one of the points in time and at least one of the actual position and the obtained second stop position of the movable part of the second robot at the at least one of the points in time are contained in the shared workspace.

2. A multiple robot control method according to claim 1, further comprising:

determining whether the actual position and the obtained second stop position of the movable part of the second robot are not contained in the shared workspace at a point in time after the braking; and when it is determined that the actual position and the obtained second stop position of the movable part of the second robot are not contained in the shared workspace at the point in time after the braking, continuing the motion of the movable part of the first robot from where the motion of the movable part of the first robot has been stopped.

3. A robot communicable with another robot and having a workspace shared with another robot, the robot comprising:
   a robot body having a movable part;
   an operating unit configured to operate the movable part;
   is a first estimating unit configured to estimate, when braking of a motion of the operated movable part is assumed to be started at a plurality of points in time, a first stop position of the movable part at each point in time;
   an accessing unit configured to access another robot to:
      obtain, when braking of a motion of an operated movable part of another robot is assumed to be started at the plurality of points in time, an estimated second stop position of the movable part of another robot at each point in time, and
      obtain an actual position of the operated movable part of another robot at each point in time;
   a first determining unit configured to determine, at least one of the points in time, whether the estimated first stop position of the movable part and at least one of the actual position and the obtained second stop position of the movable part of another robot are contained in the shared workspace; and
   a braking unit configured to brake the movable part when it is determined that the estimated first stop position of the movable part at the at least one of the points in time and at least one of the actual position and the obtained second stop position of the movable part of another robot at the at least one of the points in time are contained in the shared workspace.

4. A multiple robot control method according to claim 3, further comprising:
   a second determining unit configured to determine whether the actual position and the obtained second stop position of the movable part of the second robot are not contained in the shared workspace at a point in time after the braking of the braking unit; and
   when it is determined that the actual position and the obtained second stop position of the movable part of the second robot are not contained in the shared workspace at the point in time after the braking of the braking unit, a continuing unit configured to continue the motion of the movable part of the first robot from where the motion of the movable part of the first robot has been stopped.

5. A robot controller for a robot communicable with another robot and having a movable part and a workspace shared with another robot, in which the robot controller is operatively connected to a braking unit, the robot controller being programmed to:
   operate the movable part;
   estimate, when braking of a motion of the operated movable part is assumed to be started at a plurality of points in time, a first stop position of the movable part of the robot at each point in time;
   access another robot to:
      obtain, when braking of a motion of an operated movable part of another robot is assumed to be started at the plurality of points in time, an estimated second stop position of the movable part of another robot based on the accessed result at each point in time, and
      obtain an actual position of the operated movable part of another robot at each point in time;
   determine, at least one of the points in time, whether the estimated first stop position of the movable part of the robot and at least one of the actual position and the obtained second stop position of the movable part of another robot are contained in the shared workspace; and
   control the braking unit to brake the movable part when it is determined that the estimated first stop position of the movable part of the robot at the at least one of the points in time and at least one of the actual position and the obtained second stop position of the movable part of another robot at the at least one of the points in time are contained in the shared workspace.

6. A robot controller according to claim 5 wherein the robot controller is further programmed to:
   determine whether the actual position and the obtained second stop position of the movable part of another robot are not contained in the shared workspace at a point in time after the braking; and
   when it is determined that the actual position and the obtained second stop position of the movable part of another robot are not contained in the shared workspace at the point in time after the braking, continue the motion of the movable part of the robot from where the motion of the movable part of the robot has been stopped.

* * * * *